Dec. 24, 1968 S. W. PAYNE 3,418,594
SWITCHING DEVICE FOR SELECTIVELY CONNECTING INPUT DEVICES TO A COMMON LOAD
Filed Dec. 15, 1966
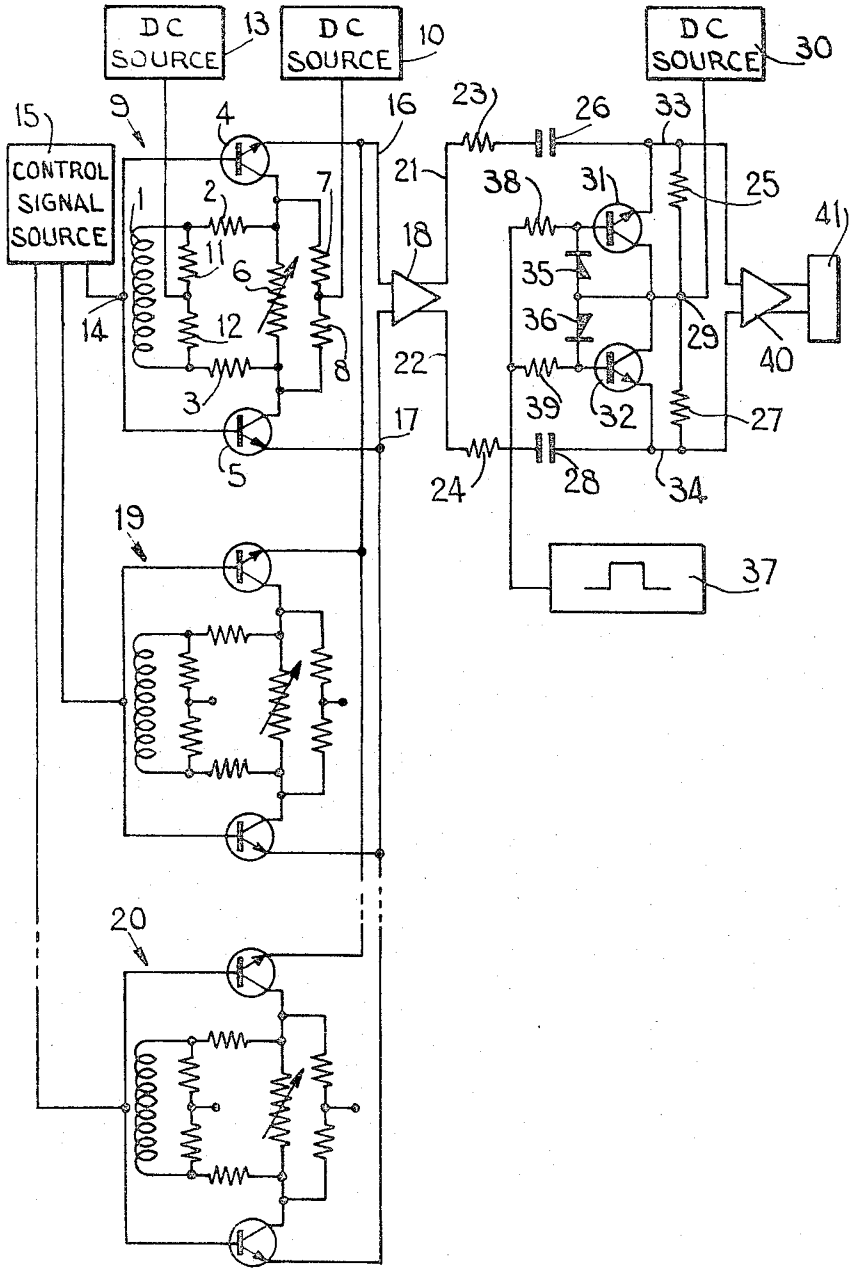
INVENTOR
Sidney William Payne
BY Hane and Nydick
ATTORNEY 3,418,594
Patented Dec. 24, 1968

3,418,594

SWITCHING DEVICE FOR SELECTIVELY CONNECTING INPUT DEVICES TO A COMMON LOAD

Sidney William Payne, Cheshunt, England, assignor to International Computers and Tabulators Limited, London, England, a British company Filed Dec. 15, 1966, Ser. No. 601,999
Claims priority, application Great Britain, Jan. 15, 1966, 2,002/66
7 Claims. (Cl. 330—147)

ABSTRACT OF THE DISCLOSURE

In a switching circuit using semiconductor switches for connecting input devices selectively to a common load through stages of an amplification circuit, a variable time constant circuit which is included between the stages has a given time constant whilst any input device is connected to the load and a shorter time constant during a switching operation of any of the switches, thereby limiting transient signals generated during the switching operation.

This invention relates to electrical switching circuits which are operable to connect a number of input devices one at a time to a common load, and in particular to circuits for use in switching reading heads in information recording apparatus.

Multiple tracks are commonly provided on information recording media such as magnetic tapes, discs and drums. In order to read out information items from a track on the medium, a reading head is provided adjacent the track, and this head generates signals which are passed to an amplifier and then to a load, such as the input register of a core store. In order to select a particular track for the reading out of items, a number of heads are frequently provided, each adjacent one of the tracks, respectively, and a switching arrangement is provided to connect the selected head to the amplifier.

Transistors have a high operating speed and are, for this reason, commonly used for switching the heads. However, each switching operation of the transistors may cause large transient voltages to be passed to the amplifier, causing overloading of the later stages of the amplifier. After such overloading, the amplifier may take an appreciable time to recover, due to the long time constants of coupling circuits in the amplifier, and signals fed to the amplifier from the selected head during the recovery time may be lost.

It is an object of the present invention to provide an electrical switching circuit in which such overloading effects are limited.

According to the present invention, an electrical switching circuit operable to connect a number of input devices selectively to a common load, includes a plurality of input switches each having at least one semiconductor switching element, each switch corresponding to a different one of said input devices, respectively; an amplifying circuit having a plurality of amplifying stages connected between said input switches and said load; means to operate said input switches one at a time to connect the corresponding input device to said amplifying circuit; and a variable time constant circuit connected between stages of said amplifying circuit and operable to have a given time constant whilst any of said input devices is connected to said load and a shorter time constant during a switching operation of any of said input switches to limit the effects on said amplifying circuit of transient signals generated during said switching operation.

One embodiment of the invention will now be described with reference to the accompanying drawing, which is a partly schematic circuit diagram of a multiple head information reading apparatus.

Referring now to the drawing, the terminals of a magnetic reading head 1, which is suitable for reading information from, for example, a magnetic tape or disc, are connected, respectively, via resistors 2 and 3 to the collector electrodes of transistors 4 and 5 which are operated in the inverted mode. The collector electrodes are connected together through a variable resistor 6 and are connected through resistors 7 and 8, respectively, to a D.C. biassing source 10. Two balancing resistors 11 and 12 are connected in series across the head 1, the junction of the resistors 11 and 12 being connected to a further D.C. source 13.

The base electrodes of the transistors 4 and 5 are connected to a terminal 14 to which control signals may be applied by a source 15. The emitter electrodes of the transistors 4 and 5 are connected, respectively, over lines 16 and 17 to input terminals of an amplifier 18 which is shown schematically and which may comprise one or more directly coupled amplification stages. The transistors 4 and 5 and the associated resistors together form an input switch 9.

Any number of further heads and associated input switches, such as the switches 19 and 20, may be provided. In each input switch the emitter electrodes of the two transistors are connected to the lines 16 and 17, respectively, and the base electrodes are connected to the source 15 which applies control signals to one switch at a time, so that any one of the heads may be connected, through its associated input switch, to the amplifier 18. For the sake of clarity, connections from D.C. sources 10 and 13 to the switches 19 and 20 are not shown.

Output lines 21 and 22 from the amplifier 18 are connected via resistors 23 and 24, respectively, to two resistance/capacitance circuits 25, 26 and 27, 28, respectively. The resistors 25 and 27 have a common terminal 29 which is connected to a D.C. biassing source 30. Transistors 31 and 32 are connected in parallel with the resistors 25 and 27, respectively, the collector electrodes of the transistors 31 and 32 being connected in common to the terminal 29, and the emitter electrodes being connected, respectively, to junction 33 between the resistor 25 and the capacitor 26, and juction 34 between the resistor 27 and the capacitor 28. The base electrodes of the transistors 31 and 32 are connected to the terminal 29 through semiconductor diodes 35 and 36, respectively, and to a positive pulse source 37 through resistors 38 and 39, respectively.

The junctions 33 and 34 are connected to the input terminals of a further amplifier 40 which may have one or more stages of amplification. The output from the amplifier 40 is fed to a load 41 which may be, for example, the input register of a core store.

In describing the operation of the apparatus, it will first be assumed that the switch 9 is held in a conductive condition by a control signal applied to the terminal 14 by the source 15, so that the head 1 is connected to the amplifier 18. Signals generated by the head 1 during the reading out of information items from a tape, disc, etc., are then amplified by the amplifier 18, are passed through the resistance/capacitance circuits 25, 26 and 27, 28 to the further amplifier 40 and are thence fed to the load 41. During this reading operation, the transistors 31 and 32 are maintained in a non-conductive condition so that the time constants of the circuits 25, 26 and 27, 28 are determined solely by the values of the resistance/capacitance components. These time constants are made sufficiently long for the information signals to be passed with the minimum of distortion.

If the switch 9 is now made non-conductive by removal of the control signal from the terminal 14, and the switch 19 is made to conduct by the application thereto of a control signal from the source 15, transient voltages are generated during the switching operations, and these voltages pass through the stages of the amplifier 18 and might normally cause blocking of the amplifier 40. Operation of the transistors in the inverted mode helps to reduce these transient voltages, but voltages caused by the transistor "ON" current flowing through the resistors in series with the signal path are unavoidable when using a balanced (push pull) head-switching circuit such as that described above. Despite this disadvantage, a balanced circuit is in most cases preferred to a switch using a single transistor because of the high interference immunity of the balanced circuit.

The blocking would persist for some appreciable time, until the stages of the amplifier 40 recovered. During the recovery time, loss of the initial information signals generated by that head which is then connected to the amplifier 18 might result.

However, in the present invention such blocking effects are limited by causing the transistors 31 and 32 to conduit, during each switching operation, by the application thereto of a positive pulse from the source 37. The conduction of the transistors 31 and 32 reduces the time constant of the circuit to that determined by the values of the resistors 23 and 24, the capacitors 26 and 28 and the small output resistances of the transistors 31 and 32 shunting the resistors 25 and 27, respectively. Furthermore, due to the shunting effect of the transistors 31 and 32, a decrease is obtained in the amplitude of the transient which would otherwise be encountered. The reactances of the capacitors 26 and 28 are made low compared with the resistances 23 and 24 in order to avoid the production of a transient when the pulse from the source 37 terminates.

Although balanced input switches including pairs of transistors, such as the transistors 4 and 5, have been specified in the input switches in the above embodiment, other types of input switch incorporating at least one semiconductor switching element might be used. For the sake of clarity, the amplifiers 18 and 40 have been shown schematically in the drawing as separate devices, with the variable time constant circuit 25, 26, 31, etc., connected between them. However, the amplifiers 18 and 40, which may be of any suitable form, may be considered together as a composite amplifying circuit, with the variable time constant circuit connected between stages of the amplifying circuit.

Although in the above embodiment the electrical switching circuit is used for switching magnetic reading heads, the circuit might alternatively be used for switching other forms of input device, including, for example, reading heads for information which is recorded non-magnetically.

What is claimed is:

1. An electrical switching circuit operable to connect a number of input devices selectively to a common load, including a plurality of input switches each having at least one semiconductor switching element, each switch corresponding to a different one of said input devices, respectively; an amplifying circuit having a plurality of amplifying stages connected between said input switches and said load; means to operate said input switches one at a time to connect the corresponding input device to said amplifying circuit; and a variable time constant circuit connected between stages of said amplifying circuit and operable to have a given time constant whilst any of said input devices is connected to said load and a shorter time constant during a switching operation of any of said input switches to limit the effects on said amplifying circuit of transient signals generated during said switching operation.

2. A switching circuit as claimed in claim 1, in which said variable time constant circuit includes a resistive element, and a low resistance path which is connected across said resistive element during said switching operation.

3. A switching circuit as claimed in claim 2, in which said low resistance path includes a transistor which is conductive only during said switching operation.

4. A switching circuit as claimed in claim 1, in which each said input switch includes a pair of transistors arranged in a balanced circuit to receive balanced input signals from the corresponding input device.

5. A switching circuit as claimed in claim 4, in which said amplification stages and said variable time constant circuit are balanced circuits.

6. A switching circuit as claimed in claim 4, in which each transistor in each input switch is operated in the inverted mode.

7. A switching circuit as claimed in claim 1, in which each said input switch is operable to connect an information reading head to said amplifying circuit.

References Cited

FOREIGN PATENTS 922,265 3/1963 Great Britain.

JOHN KOMINSKI, *Primary Examiner.*

JAMES B. MULLINS, *Assistant Examiner.*

U.S. Cl. X.R.

330—164, 30; 328—104